US010831241B1

(12) United States Patent
Watamura et al.

(10) Patent No.: US 10,831,241 B1
(45) Date of Patent: Nov. 10, 2020

(54) PORTABLE INFORMATION DEVICE

(71) Applicant: LENOVO (SINGAPORE) PTE. LTD., Singapore (SG)

(72) Inventors: Kenji Watamura, Yokohama (JP); Seita Horikoshi, Yokohama (JP); Masayuki Amano, Yokohama (JP); Kazuo Fujii, Yokohama (JP)

(73) Assignee: LENOVO (SINGAPORE) PTE. LTD., Singapore (SG)

( * ) Notice: Subject to any disclaimer, the term of this patent is extended or adjusted under 35 U.S.C. 154(b) by 0 days.

(21) Appl. No.: 16/683,263

(22) Filed: Nov. 14, 2019

(30) Foreign Application Priority Data

Aug. 27, 2019 (JP) .................................. 2019-154922

(51) Int. Cl.
*G06F 1/16* (2006.01)
*B32B 7/12* (2006.01)

(52) U.S. Cl.
CPC .............. *G06F 1/1652* (2013.01); *B32B 7/12* (2013.01); *G06F 1/1618* (2013.01); *G06F 1/1641* (2013.01); *G06F 1/1681* (2013.01); *G06F 1/1683* (2013.01)

(58) Field of Classification Search
CPC .... G06F 1/1652; G06F 1/1683; G06F 1/1641; G06F 1/1618; G06F 1/1681; B32B 7/12
See application file for complete search history.

(56) References Cited

U.S. PATENT DOCUMENTS

| | | | | |
|---|---|---|---|---|
| 10,001,811 | B1* | 6/2018 | Watamura | G06F 1/1616 |
| 10,067,536 | B1* | 9/2018 | Watamura | G06F 1/1626 |
| 10,431,129 | B2* | 10/2019 | Wakata | G09F 9/30 |
| 2015/0043174 | A1* | 2/2015 | Han | G06F 1/1626 361/749 |
| 2016/0209874 | A1* | 7/2016 | Choi | G06F 1/1652 |
| 2018/0196469 | A1* | 7/2018 | Yamauchi | G06F 1/1626 |
| 2018/0343756 | A1* | 11/2018 | Lin | B32B 7/12 |
| 2019/0146556 | A1* | 5/2019 | Mizoguchi | G06F 1/1652 361/679.27 |

FOREIGN PATENT DOCUMENTS

JP      2018112833 A    7/2018

* cited by examiner

*Primary Examiner* — Abhishek M Rathod
(74) *Attorney, Agent, or Firm* — Shimokaji IP

(57) ABSTRACT

A portable information device includes a first support plate fixed to a first chassis member; a second support plate fixed to a second chassis member and provided adjacent to the first support plate; a display whose rear surface is supported by a front surface of the first support plate and the second support plate; and an adhesive member configured to fix the front surface of the first support plate and the second support plate and the rear surface of the display. The adhesive member has a first adhesive layer adhered to the rear surface of the display; and a second adhesive layer adhered to a part of the front surface of the first support plate and the second support plate and including a non-adhesive portion provided in at least a range overlapping with a bending region.

4 Claims, 7 Drawing Sheets

PORTABLE INFORMATION DEVICE

FIELD OF THE INVENTION

The present invention relates to a portable information device having rotatable chassis.

BACKGROUND OF THE INVENTION

In recent years, portable information devices, such as a tablet PC and a smartphone having a touch panel type liquid crystal display and not having a physical keyboard, have rapidly spread. The display of this kind of portable information device is desirable to be large in use but small in non-use. Then, a portable information device has been proposed in which not only a chassis but also a display is configured so as to be foldable by the use of a flexible display, such as an organic EL (Electro Luminescence) (for example, refer to Japanese Unexamined Patent Application Publication No. 2018-112833).

SUMMARY OF THE INVENTION

In the configuration of the above-described Japanese Unexamined Patent Application Publication No. 2018-112833, a sheet-like member such as a metallic foil is pasted to an upper surface of a pair of right and left support plates to support a display by its front surface. Herein, with respect to the sheet-like member and the support plates, a non-adhesive region is provided in a portion corresponding to a bending portion of the support plates, which allows bending operation between the support plates.

Now these support plates and the sheet-like member are typically adhered using a double-sided tape. Then, the double-sided tape is not provided in the portion corresponding to the bending portion to form the non-adhesive region. This structural change may be projected on a very thin structured display and lines or streaks may appear on the front surface of the display. This may lead to reduction in the quality of appearance or viewability.

The present invention has been made considering the above-described problems of the prior art. It is an object of the present invention to provide a portable information device capable of improving the quality of appearance or viewability of the display.

A portable information device according to a first aspect of the present invention is a portable information device, including: a first chassis member; a second chassis member relatively rotatably joined with the first chassis member; a first support plate fixed to the first chassis member; a second support plate fixed to the second chassis member and provided adjacent to the first support plate; a display whose rear surface is supported by a front surface of the first support plate and the second support plate and having a bending region to be bent in accordance with relative rotation of the first chassis member and the second chassis member; and an adhesive member configured to fix the front surface of the first support plate and the second support plate and the rear surface of the display by adherence, in which the adhesive member has: a first adhesive layer adhered to the rear surface of the display; and a second adhesive layer adhered to a part of the front surface of the first support plate and the second support plate and including a non-adhesive portion provided in at least a range overlapping with the bending region.

The non-adhesive portion may be configured so that a film-like member having no adhesive layer on at least one surface is disposed in a recessed portion formed in the second adhesive layer and the one surface of the film-like member faces the first support plate and the second support plate.

The non-adhesive portion may be configured so that a film-like member having no adhesive layer on at least one surface is fixed to a part of a front surface of the second adhesive layer and the one surface of the film-like member faces the first support plate and the second support plate.

The adhesive member may have a base material, the first adhesive layer provided on a first surface of the base material, and the second adhesive layer provided on a second surface of the base material.

The adhesive member may have a base material, the first adhesive layer provided on a first surface of the base material, and the second adhesive layer provided on a second surface of the base material, and the non-adhesive portion may be configured so that a part of the second adhesive layer is cut off to expose the base material.

According to the above-described aspects of the present invention, the occurrence of failure in the display can be prevented.

DETAILED DESCRIPTION OF THE INVENTION

Hereinafter, preferable embodiments of the portable information device according to the present invention are described in detail with reference to the attached drawings.

Figure 1:
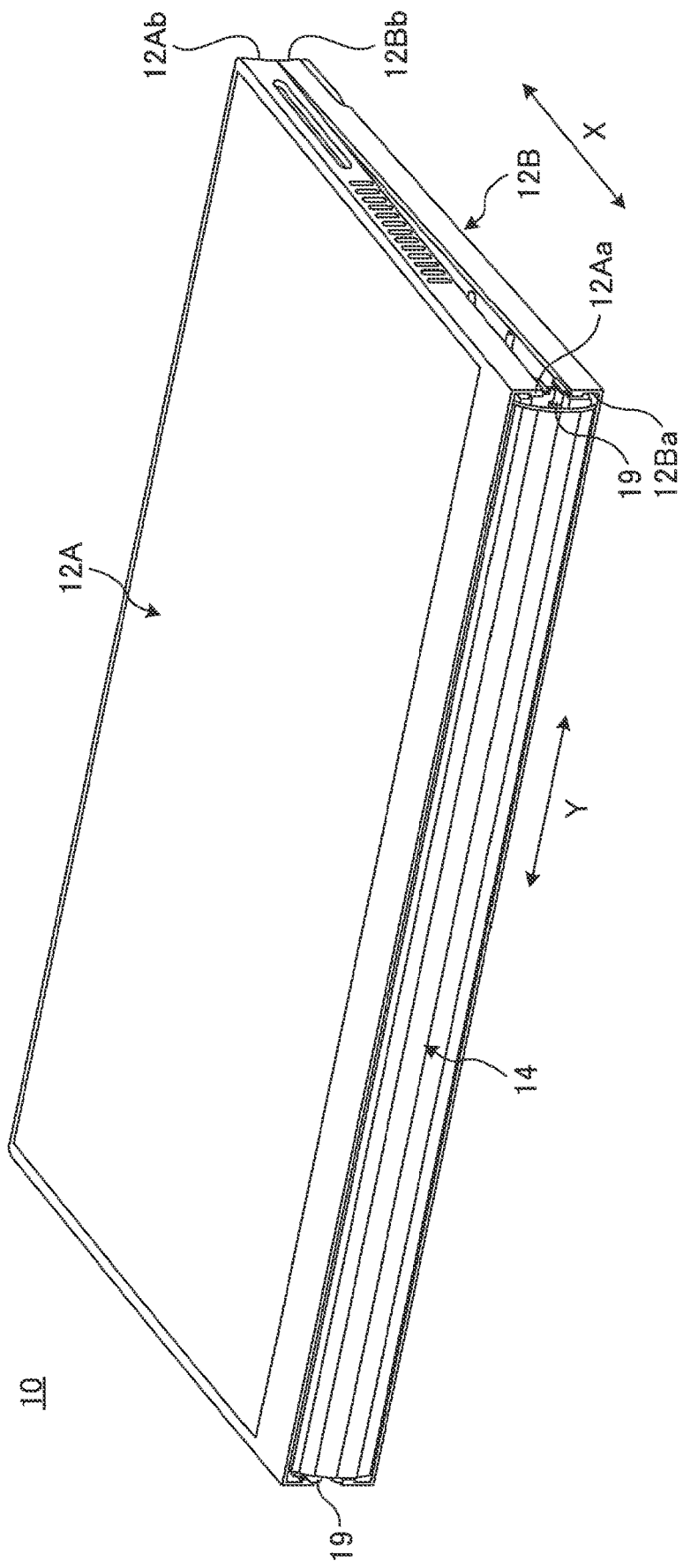
FIG. 1 is a perspective view illustrating a state where a portable information device according to one embodiment is closed into a storage form.
Figure 2:
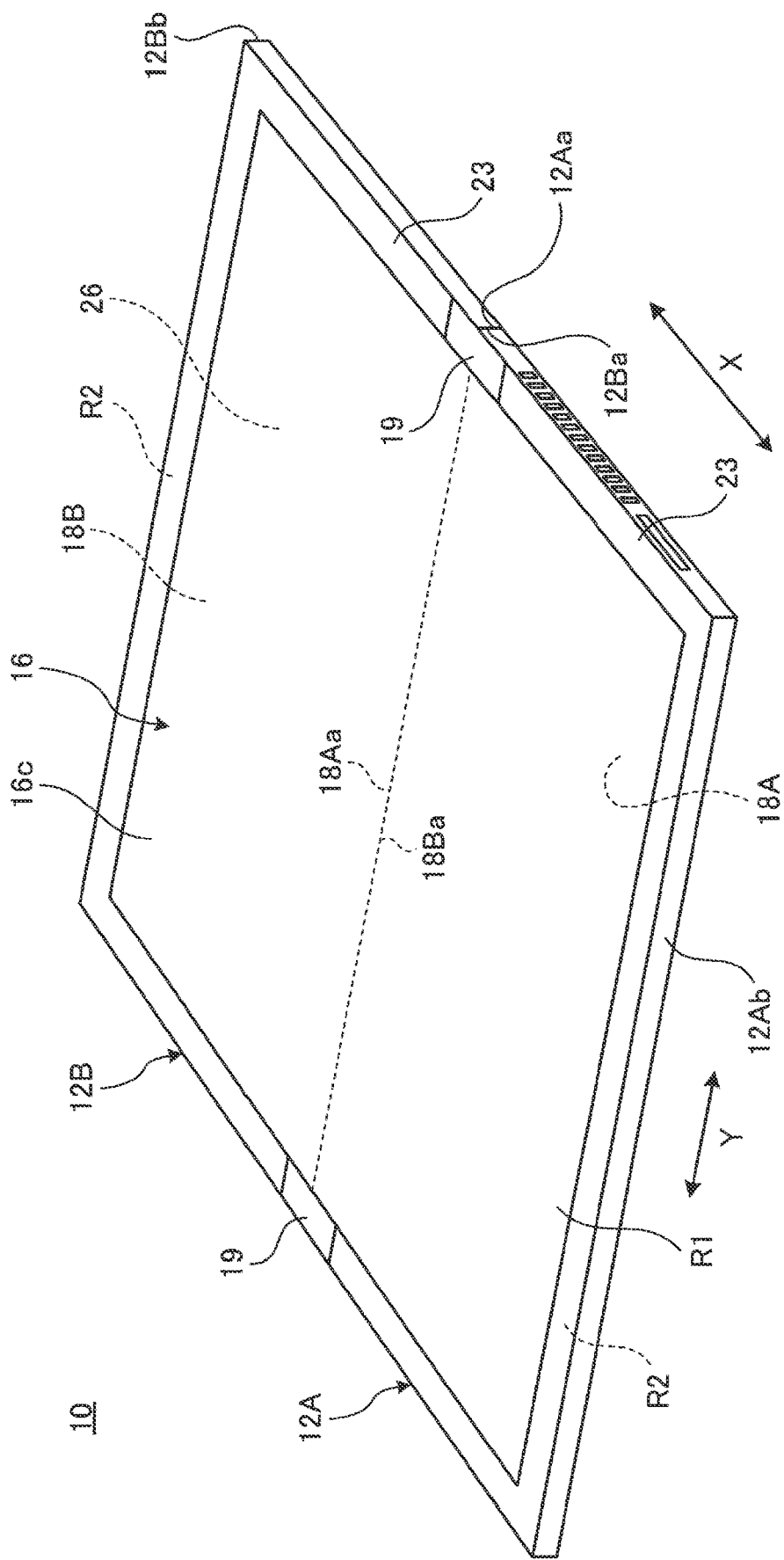
FIG. 2 is a perspective view schematically illustrating a state where the portable information device illustrated in FIG. 1 is opened into a usage form.
Figure 3:
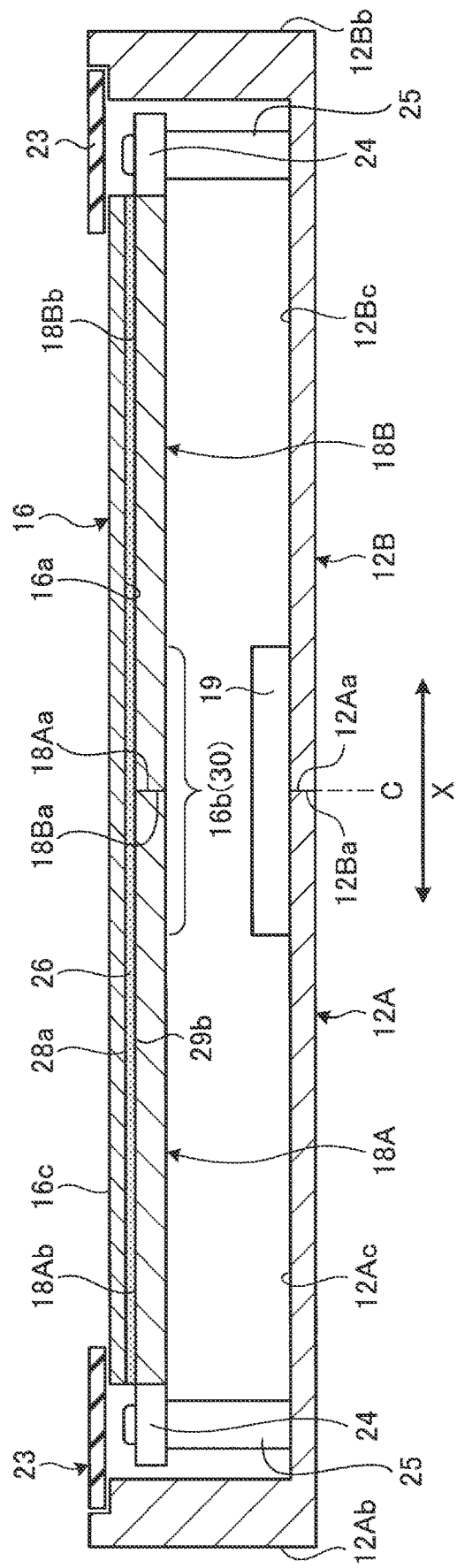
FIG. 3 is a side cross-sectional view schematically illustrating the internal structure of the portable information device illustrated in FIG. 2.

FIG. 1 is a perspective view illustrating a state where a portable information device 10 according to one embodiment is closed into a storage form. FIG. 2 is a perspective view schematically illustrating a state where the portable information device 10 illustrated in FIG. 1 is opened into a usage form. FIG. 3 is a side cross-sectional view schematically illustrating the internal structure of the portable information device 10 illustrated in FIG. 2.

As illustrated in FIG. 1 and FIG. 2, the portable information device 10 includes a first chassis member 12A, a second chassis member 12B, a backbone member 14, and a display 16. The portable information device 10 of the present embodiment is a tablet PC which is foldable like a book. The portable information device 10 may be a cellular phone, a smartphone, an electronic notebook, a portable game console, or the like.

The chassis members 12A and 12B are each rectangular plate-like members in which the side walls are formed so as to be raised on three sides other than the side corresponding to the backbone member 14. The chassis members 12A and 12B each include metal plates of stainless steel, magnesium, or aluminum etc., or fiber reinforced resin plates containing reinforced fibers, such as carbon fibers, and the like, for example. The display 16 is provided over inner surfaces 12Ac and 12Bc of the chassis members 12A and 12B. The display 16 is supported with respect to the inner surfaces 12Ac and 12Bc through a first support plate 18A and a second support plate 18B.

The chassis members 12A and 12B are disposed side by side to each other. The chassis members 12A and 12B are joined through a pair of hinge mechanisms 19 and 19 provided on both end portions of one edge portions 12Aa and 12Ba which are each other's adjacent edge portions. The hinge mechanisms 19 join the chassis members 12A and 12B so that they are foldable into the storage form illustrated in FIG. 1 and the usage form illustrated in FIG. 2. A line C illustrated by the dashed-dotted line in FIG. 3 represents a bending center C serving as the center of folding operation of the chassis members 12A and 12B. In the respective chassis members 12A and 12B, the one edge portions 12Aa and 12Ba on the side of the backbone member 14 serve as hinge side end portions. In the respective chassis members 12A and 12B, other edge portions 12Ab and 12Bb on the side opposite to the backbone member 14 serve as open end portions.

The hinge mechanism 19 is disposed on each of both end portions in a longitudinal direction (Y direction) of the one edge portions 12Aa and 12Ba of the chassis members 12A and 12B and is located outside of the outer peripheral edge portion of the display 16, for example. In the portable information device 10 of the present embodiment, the center of rotation of the chassis members 12A and 12B by the hinge mechanism 19 is configured so as to correspond to a surface 16c of the display 16.

Hereinafter, the portable information device 10 is described defining a direction from the backbone member 14 at the center to the other edge portions 12Ab and 12Bb as an X direction and a direction along the longitudinal direction of the backbone member 14 as a Y direction, as illustrated in FIG. 1 and FIG. 2.

The display 16 is a touch panel type liquid crystal display, for example. The display 16 is a flexible display, such as an organic EL having a paper structure with high flexibility, for example. The display 16 is opened/closed with opening/closing operation of the chassis members 12A and 12B. A bezel member 23 is disposed on the outer peripheral edge portion of the front surface 16c of the display 16. The bezel member 23 covers a non-display region (inactive region) R2 of the outer peripheral edge portion excluding a display region (active region) R1 of the front surface of the display 16. The display 16 is an assembly component in which a touch panel part as a top layer, a display part as a middle layer, and a cover film part as a bottom layer etc. are laminated.

The display 16 is fixed in place to the chassis members 12A and 12B through attachment pieces 24 projectingly provided on the outer peripheral end surfaces of the support plates 18A and 18B, as illustrated in FIG. 3, for example. A plurality of the attachment pieces 24 are provided at appropriate locations of the outer peripheral edge portions other than the adjacent one edge portions 18Aa and 18Ba of the support plates 18A and 18B. The attachment pieces 24 are screwed to boss portions 25 provided on the inner surfaces 12Ac and 12Bc, for example. Thus, the support plates 18A and 18B are each attached to the inner surfaces 12Ac and 12Bc of the chassis members 12A and 12B, respectively.

Various kinds of components including a substrate, various types of semiconductor chips such as CPU, a communication module, a battery device, or a cooling device are attached and fixed in the chassis interior space sandwiched between the respective chassis members 12A and 12B and the respective support plates 18A and 18B.

The backbone member 14 is formed of a thin plate-like member having flexibility and serves as a backbone in folding the portable information device 10. The backbone member 14 is provided throughout between the chassis members 12A and 12B so as to cover the one edge portions 12Aa and 12Ba from the inner side. As illustrated in FIG. 1, in the storage form of the portable information device 10, the one edge portions 12Aa and 12Ba of the chassis members 12A and 12B greatly separate to form a gap. The backbone member 14 covers this gap between the one edge portions 12Aa and 12Ba to thereby prevent the display 16 and various kinds of components provided inside from being exposed.

Next, an example of the configuration of the support plates 18A and 18B is described. As illustrated in FIG. 3, the support plates 18A and 18B are each a thin plate-like member. The support plates 18A and 18B are plates for supporting the display 16. A rear surface 16a of the display 16 is fixed with respect to the upper surfaces 18Ab and 18Bb of the support plates 18A and 18B using an adhesive member 26. The support plates 18A and 18B are each supported by each of the chassis members 12A and 12B, respectively, and are opened/closed like a book centering on the bending center C.

The support plates 18A and 18B are made of metal plates of stainless steel etc., fiber reinforced resin plates containing carbon fibers etc., or the like, for example. In the usage form, the adjacent one edge portions 18Aa and 18Ba of the support plates 18A and 18B abut on each other (refer to FIG. 4A). In the storage form, the one edge portions 18Aa and 18Ba of the support plates 18A and 18B are separated from each other (refer to FIG. 4B).

Figure 4A:
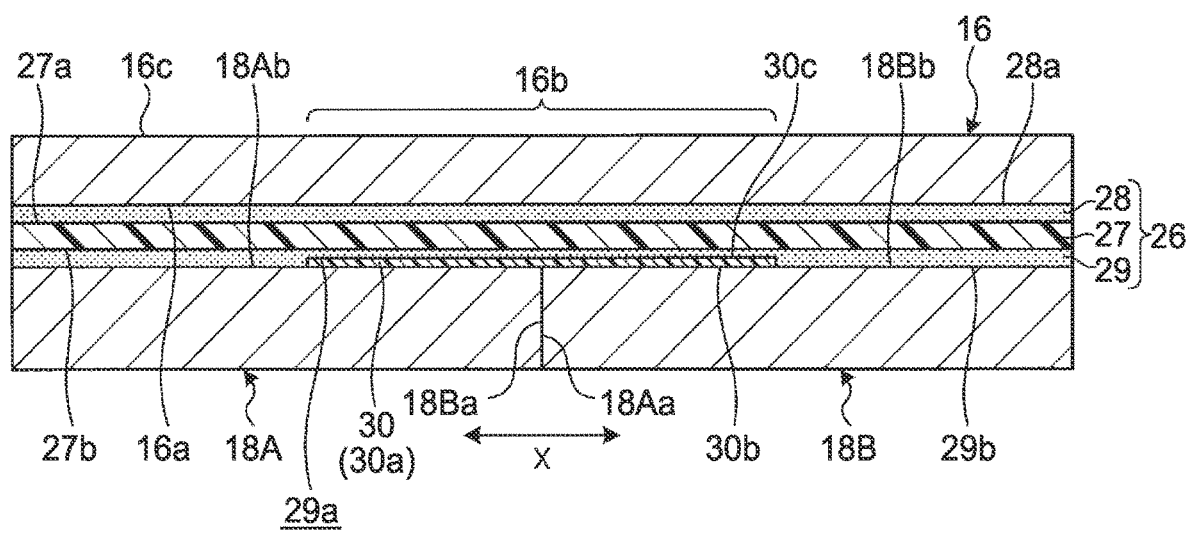
FIG. 4A is a side cross-sectional view schematically illustrating the configuration of a display, an adhesive member, and support plates in the usage form.
Figure 4B:
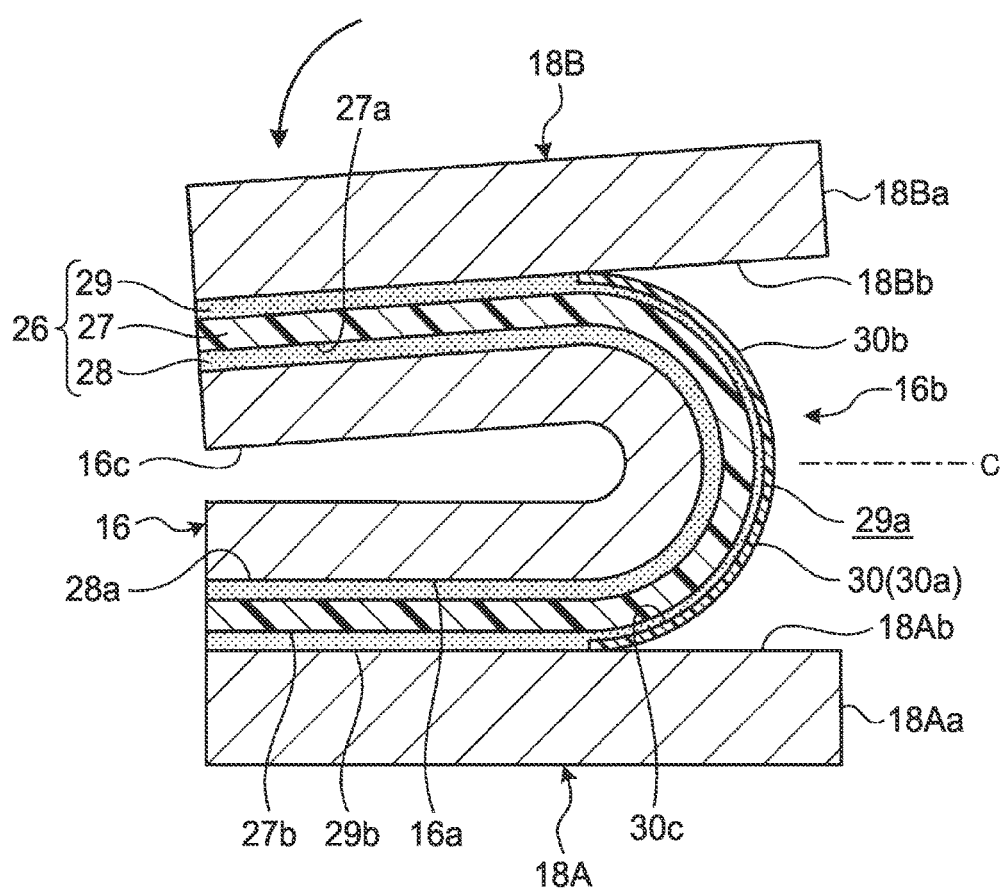
FIG. 4B is a side cross-sectional view schematically illustrating the configuration of the display, the adhesive member, and the support plates in the storage form.
Figure 5:
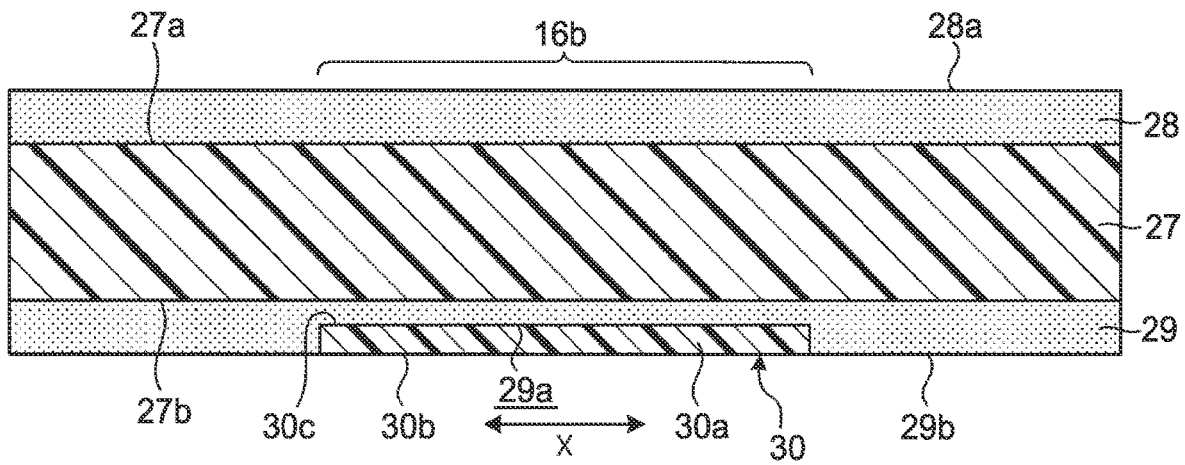
FIG. 5 is a schematic side cross-sectional view of the enlarged adhesive member.

Next, an example of the configuration of the adhesive member 26 is described. FIG. 4A is a side cross-sectional view schematically illustrating the configuration of the display 16, the adhesive member 26, and the support plates 18A and 18B in the usage form. FIG. 4B is a side cross-sectional view schematically illustrating the configuration of the display 16, the adhesive member 26, and the support plates 18A and 18B in the storage form. FIG. 5 is a schematic side cross-sectional view of the enlarged adhesive member 26.

As illustrated in FIG. 4A and FIG. 4B, the adhesive member 26 fixes the rear surface 16a of the display 16 and the upper surfaces 18Ab and 18Bb of the support plates 18A and 18B. The adhesive member 26 is a double-sided tape, for example. The adhesive member 26 is a double-sided PSA (Pressure Sensitive Adhesive) tape or a double-sided OCA (Optical Clear Adhesive) tape etc., for example. It is to be noted that the adhesive member means a member for fixing two materials and is a concept also including an adhesive or a bonding adhesive etc. which is used by application just like a double-sided tape, other than a double-sided tape formed like a tape.

As illustrated in FIG. 4A to FIG. 5, the adhesive member 26 has a base material 27, a first adhesive layer 28, and a second adhesive layer 29. The base material 27 is a thin sheet-like member formed of paper or resin such as vinyl etc., for example. The thickness of the adhesive member 26 including the base material 27, the first adhesive layer 28, and the second adhesive layer 29, is about 30 μm to 50 μm, for example.

The first adhesive layer 28 is a layer in which an adhesive or a bonding adhesive is provided on an upper surface 27a of the base material 27. The adhesive forming the first adhesive layer 28 and the second adhesive layer 29 may be a material which is used for a typical double-sided tape, such as a rubber-based material or an acrylic material, for example. An upper surface 28a of the first adhesive layer 28 is adhered and fixed to the whole surface of the rear surface 16a of the display 16. The upper surface 28a may be adhered to only a part of the rear surface 16a, instead of the whole surface thereof.

The second adhesive layer 29 is a layer in which an adhesive or a bonding adhesive is provided on a lower surface 27b of the base material 27. A non-adhesive portion 30 is provided in a part of the second adhesive layer 29. The non-adhesive portion 30 is provided in a range that overlaps with a bending region 16b of the display 16. The non-adhesive portion 30 may be provided in a range which slightly wider than the bending region 16b of the display 16. The bending region 16b is a portion in which the display 16 is curved into an arc shape when the chassis members 12A and 12B and the support plates 18A and 18B are folded (refer to FIG. 4B). The bending region 16b is a belt-like region that strides over the one edge portions 18Aa and 18Ba of the support plates 18A and 18B in the X direction and extends in the Y direction.

The non-adhesive portion 30 has a configuration in which a film-like member 30a is disposed in a recessed portion 29a of the second adhesive layer 29. The recessed portion 29a is a groove portion in which a part of a lower surface 29b of the second adhesive layer 29 is recessed upward, and extends in the Y direction. The recessed portion 29a is formed in a range that overlaps with the bending region 16b of the display 16. The film-like member 30a is a film that has no adhesive layer on a lower surface 30b and an upper surface 30c, and is a resin film such as a PET (polyethylene terephthalate) film, for example. The film-like member 30a may be configured to have no adhesive layer on at least the lower surface 30b because the upper surface 30c is adhered to the second adhesive layer 29 within the recessed portion 29a. The thickness of the film-like member 30a is about 10 μm to 25 μm, for example.

A part of the lower surface 29b of the second adhesive layer 29 excluding the non-adhesive portion 30 is adhered and fixed to the upper surfaces 18Ab and 18Bb of the support plates 18A and 18B. The non-adhesive portion 30 of the lower surface 29b is not adhered to the upper surfaces 18Ab and 18Bb since it has no adhesive layer on at least the lower surface 30b. Thus, the non-adhesive portion 30 is in contact with the upper surfaces 18Ab and 18Bb in a relatively movable state.

Therefore, when the portable information device 10 is folded from the usage form illustrated in FIG. 4A into the storage form illustrated in FIG. 4B, the non-adhesive portion 30 of the adhesive member 26 separates from the upper surfaces 18Ab and 18Bb of the support plates 18A and 18B. Thus, the one edge portions 18Aa and 18Ba of the support plates 18A and 18B separates as illustrated in FIG. 4B so that the portable information device 10 is smoothly folded into the storage form.

Next, when the portable information device 10 is opened from the storage form illustrated in FIG. 4B into the usage form illustrated in FIG. 4A, end surfaces of the one edge portions 18Aa and 18Ba of the support plates 18A and 18B abut on each other and the upper surfaces 18Ab and 18Bb form one plane without a level difference. At the same time, the whole surface of the lower surface 29b of the second adhesive layer 29 including the non-adhesive portion 30 is disposed on the upper surfaces 18Ab and 18Bb without a level difference. Thus, in the usage form illustrated in FIG. 4A, the rear surface 16a of the display 16 is supported by the upper surfaces 18Ab and 18Bb and adhesive member 26 that constitute a uniform plane without a level difference. As a result, the front surface 16c of the display 16 also constitutes a uniform plane without a level difference. Thus, it becomes less likely that lines or streaks appear on the front surface 16c of the display 16, and the quality of appearance or viewability thereof is improved.

In addition, the adhesive member 26 includes the non-adhesive portion 30 formed by disposing the film-like member 30a in the recessed portion 29a formed in the second adhesive layer 29. Thus, the film-like member 30a does not project from the lower surface 29b of the second adhesive layer 29 and a level difference is more surely prevented from occurring in the adhesive member 26.

Figure 6:
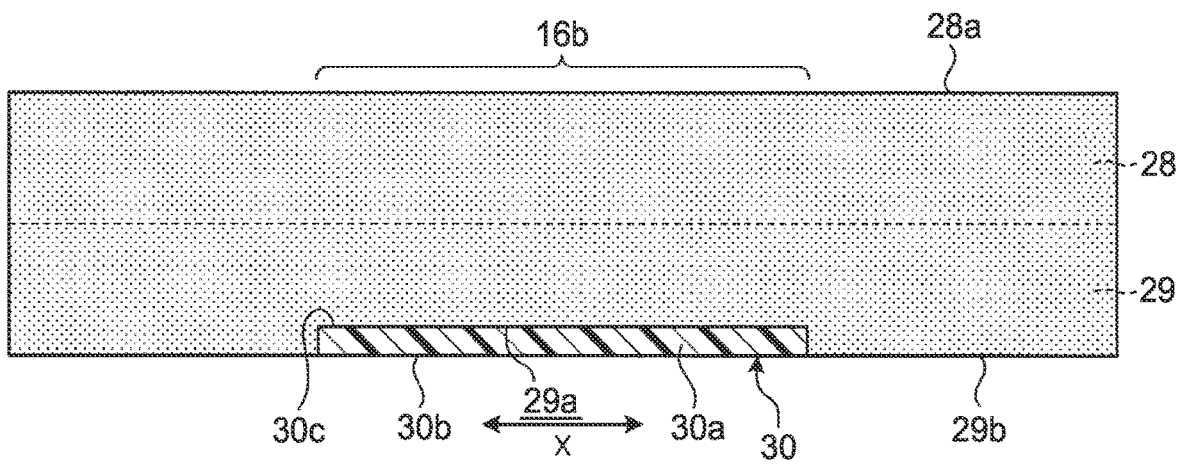
FIG. 6 is a schematic side cross-sectional view of an adhesive member according to a first modification.

FIG. 6 is a schematic side cross-sectional view of an adhesive member 26A according to a first modification. The adhesive member 26A illustrated in FIG. 6 is different from the adhesive member 26 illustrated in FIG. 5 in that it has no base material 27.

The adhesive member 26A is formed entirely of the same adhesive or bonding adhesive as the above-described first adhesive layer 28 or second adhesive layer 29. Thus, the adhesive member 26A includes the first adhesive layer 28 on the upper surface 28a side and the second adhesive layer 29 on the lower surface 29b side with reference to the center line in the thickness direction shown by a dashed line in FIG. 6, for example. The adhesive member 26A also has the recessed portion 29a formed in the lower surface 29b of the second adhesive layer 29 and has the non-adhesive portion 30 in which the film-like member 30a is embedded in the recessed portion 29a. Therefore, the adhesive member 26A can also have the same operational effects as the above-described adhesive member 26. In addition, the adhesive member 26A has an advantage of being easily formed so as to make the entire thickness smaller than that of the above-described adhesive member 26, due to having no base material 27.

Figure 7:
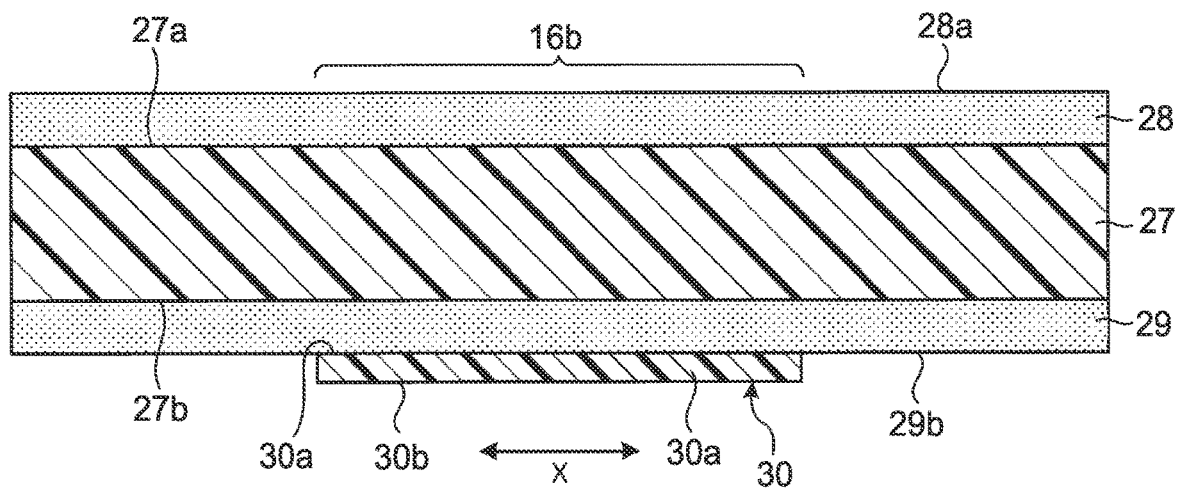
FIG. 7 is a schematic side cross-sectional view of an adhesive member according to a second modification.

FIG. 7 is a schematic side cross-sectional view of an adhesive member 26B according to a second modification. The adhesive member 26B illustrated in FIG. 7 is different from the adhesive member 26 illustrated in FIG. 5 in the arrangement of the film-like member 30a.

The non-adhesive portion 30 of the adhesive member 26B is configured so that the film-like member 30a is pasted to the lower surface 29b of the second adhesive layer 29. Thus, the adhesive member 26B is highly efficiently manufactured unlike the above-described adhesive member 26 since it is not necessary to form the recessed portion 29a in the second adhesive layer 29. In this regard, however, in the adhesive member 26B, a level difference of the thickness of the film-like member 30a occurs on the upper surfaces 18Ab and 18Bb of the support plates 18A and 18B. However, the thickness of the film-like member 30a can be configured so as to be considerably thinner than the double-sided tape constituting the adhesive member 26B. Thus, the impact of the level difference of the film-like member 30a on the front surface 16c of the display 16 can also be kept to an almost negligible level. In addition, the film-like member 30a is provided on the lower surface 29b side instead of the upper surface 28a side of the adhesive member 26B. Thus, since the adhesive member 26 is configured so as to have no level difference on at least the upper surface 28a supporting the display 16, the impact on the display 16 is made much smaller.

Figure 8:
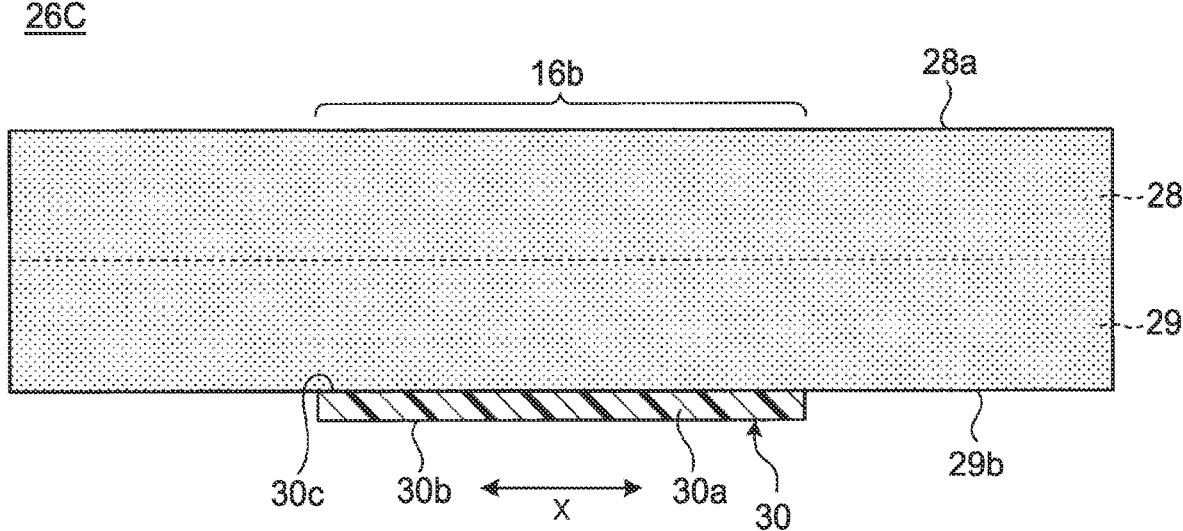
FIG. 8 is a schematic side cross-sectional view of an adhesive member according to a third modification.

FIG. 8 is a schematic side cross-sectional view of an adhesive member 26C according to a third modification. The adhesive member 26C illustrated in FIG. 8 is different from the adhesive member 26A illustrated in FIG. 6 in the arrangement of the film-like member 30a.

The adhesive member 26C is formed entirely of the same adhesive or bonding adhesive as the above-described first adhesive layer 28 or second adhesive layer 29, just like the adhesive member 26A. The non-adhesive portion 30 of the adhesive member 26C is configured so that the film-like member 30a is pasted to the lower surface 29b of the second adhesive layer 29. Thus, the adhesive member 26C is highly efficiently manufactured just like the adhesive member 26B illustrated in FIG. 7 since it is not necessary to form the recessed portion 29a in the second adhesive layer 29.

Figure 9:
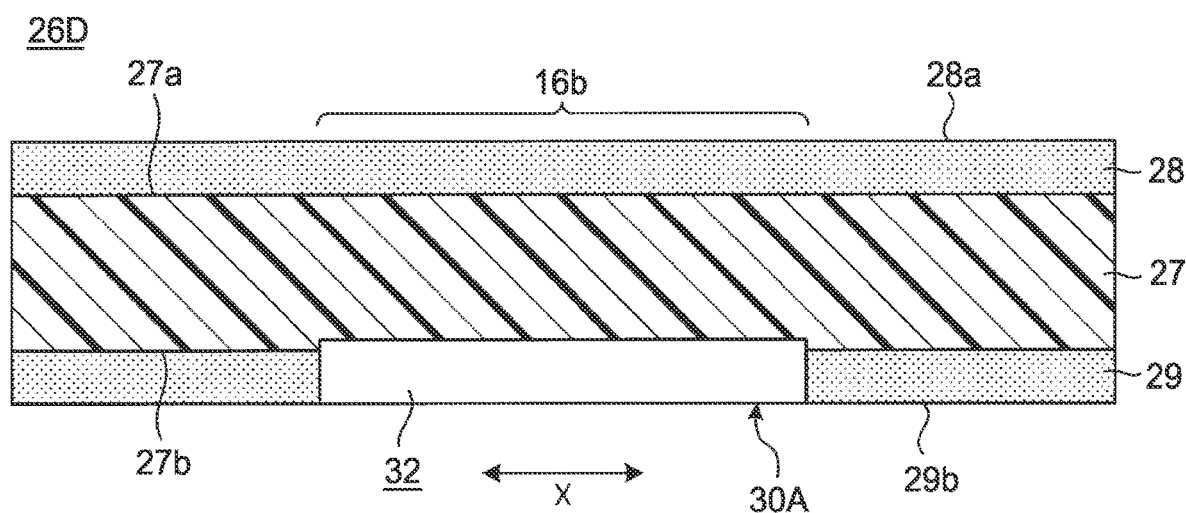
FIG. 9 is a schematic side cross-sectional view of an adhesive member according to a fourth modification.

FIG. 9 is a schematic side cross-sectional view of an adhesive member 26D according to a fourth modification. The adhesive member 26D illustrated in FIG. 9 is different from the adhesive member 26 illustrated in FIG. 5 in that it has a non-adhesive portion 30A the configuration of which is different from that of the non-adhesive portion 30.

The non-adhesive portion 30A is configured so that a part of the second adhesive layer 29 is cut off upward from the lower surface 29b into a recessed shape to expose the base material 27. Specifically, the non-adhesive portion 30A has a hole portion 32 in which a part of the second adhesive layer 29 which portion overlaps with the bending region 16b is cut off. The hole portion 32 penetrates through the second adhesive layer 29 and is dug deep to expose at least the lower surface 27b of the base material 27. In an example of the configuration illustrated in FIG. 9, the hole portion 32 reaches deeper than the lower surface 27b of the base material 27. In this way, in the adhesive member 26D, a part of the second adhesive layer 29 to be fixed to the support plates 18A and 18B is cut off by the hole portion 32. As a result, the hole portion 32 constitutes the non-adhesive portion 30A that is not adhered to the support plates 18A and 18B. Thus, the adhesive member 26D can also have the same operational effects as the above-described adhesive member 26 etc. In addition, since it is not necessary to use the film-like member 30a in the adhesive member 26D, component cost can be reduced compared to the above-described adhesive member 26 etc.

It is a matter of course that the present invention is not limited to the embodiments described above and can be freely altered without deviating from the scope of the present invention.

Although the portable information device 10 foldable into a double-folded state like a book is illustrated by an example in the above, the present invention can be applied to various configurations, such as a hinged double door configuration of foldably joining respective small chassis members with right and left edge portions of a large chassis member, an S-type folding configuration of joining respective chassis members with different folding directions with right and left edge portions of one chassis member, a J-type folding configuration of foldably joining a small chassis member with either right or left edge portion of a large chassis member and the like, other than the configuration of folding chassis members of the same shape into a double-folded state, and the number of joined chassis members may be four or more.

The invention claimed is:

1. A portable information device, comprising:
    a first chassis member;
    a second chassis member rotatably joined with the first chassis member;
    a first support plate fixed to the first chassis member;
    a second support plate fixed to the second chassis member and is adjacent to the first support plate;
    a display having a rear surface supported by a front surface of the first support plate and the second support plate, and having a bending region to be bent in accordance with relative rotation of the first chassis member and the second chassis member; and
    an adhesive member configured to fix the front surface of the first support plate and the second support plate and the rear surface of the display by adherence,
    wherein the adhesive member has:
    a first adhesive layer adhered to the rear surface of the display; and
    a second adhesive layer adhered to a part of the front surface of the first support plate and the second support plate and including a non-adhesive portion in at least an area overlapping with the bending region;
    wherein: the non-adhesive portion is configured so that a film-like member having no adhesive layer on at least one surface is in a recessed portion formed in the second adhesive layer, and the at least one surface of the film-like member is in an abutting configuration with the first support plate and the second support plate when portable information device is in planner configuration.

2. The portable information device according to claim 1, wherein:
    the non-adhesive portion is configured so that a film-like member having no adhesive layer on at least one surface is fixed to a part of a front surface of the second adhesive layer, and the one surface of the film-like member faces the first support plate and the second support plate.

3. The portable information device according to claim 1, wherein:
    the adhesive member has a base material, the first adhesive layer is on a first surface of the base material, and the second adhesive layer is on a second surface of the base material.

4. The portable information device according to claim 1, wherein:
    the adhesive member has a base material, the first adhesive layer is on a first surface of the base material, and the second adhesive layer is on a second surface of the base material, and
    the non-adhesive portion is configured so that a part of the second adhesive layer is cut off to expose the base material.

* * * * *